United States Patent [19]
Boulin et al.

[11] 3,755,762
[45] Aug. 28, 1973

[54] METHOD OF BUILDING FOR ELECTRIC FILTERS

[75] Inventors: Jacques R. Boulin, Paris; Alexis Nepomiastchy, Bagneux, both of France

[73] Assignee: Societe Anonyme de Telecommunications, Paris, France

[22] Filed: May 22, 1972

[21] Appl. No.: 255,585

[30] Foreign Application Priority Data
Feb. 23, 1972 France .............................. 7206035

[52] U.S. Cl. ............ 333/70 S, 317/101 C, 333/70 R
[51] Int. Cl. ........ H03h 7/04, H05k 1/16, H05k 1/18
[58] Field of Search ...................... 333/70, 70 S, 78, 333/24 R, 84 M; 317/101 C, 101 CW

[56] References Cited
UNITED STATES PATENTS
3,195,050  7/1965  Bray ............................ 317/101 C X
2,141,573  12/1938  Vogt .................................... 333/78
2,855,571  10/1958  Kleespies ......................... 333/78 X
2,882,403  4/1959  DeWitz ............................ 333/78 X FOREIGN PATENTS OR APPLICATIONS
821,747  10/1959  Great Britain .................... 333/70 S Primary Examiner—Rudolph V. Rolinec
Assistant Examiner—Marvin Nussbaum
Attorney—Abraham A. Saffitz

[57] ABSTRACT

A low cost and reduced bulk electric filter construction, in particular for telecommunication equipment, in the form of an assembly of inductances and capacitors, in which all the inductances of the filter use as magnetic cores a common ferrite block consisting of two contiguous parts. The capacitors are preferably grouped in a single insulating wafer placed in contact with the outside surface of one of the said contiguous parts.

7 Claims, 6 Drawing Figures

3,755,762

METHOD OF BUILDING FOR ELECTRIC FILTERS

This invention relates to a novel form of constructing electric filters using inductances and capacitances, of use inter alia in telecommunication equipment. Frequency-selective filters of this kind for high-pass, low-pass, band-stop or band-pass operation comprise windings and capacitors whose assembly scheme and nominal inductance and capacitance values have been determined by one or other of the known methods for filter calculation. To construct filters of this kind, the commonest procedure is to assemble discrete elements — i.e. capacitors and windings — which are interconnected electrically to make up the required scheme. Another known procedure is to embody electric filters by associating with one another elements which have the same mechanical dimensions as one another and in which a winding and one or more capacitors forming an electrical tripole are grouped. This procedure is described inter alia in the U.S. Pat. No. 3,646,481 and in the U.S. Pat. Application Ser. No. 101,691 filed Dec. 28, 1970, by the present applicants.

This invention relates to the construction of electric filters which have the same uses as the known filters but whose design and therefore construction are different.

This invention provides an electric filter construction for telecommunications equipment, in the form of an assembly of inductances and capacitors, characterized in that all the inductances of the filter use as magnetic cores a single ferrite block consisting of two contiguous parts.

According to another feature of this invention, the capacitors which are used in the filter are, with advantage, grouped on a single plate or wafer or the like which also bears the wiring interconnecting the inductances and capacitors making up the filter. The connecting wiring is preferably in the form of a printed circuit formed with apertures adapted to receive the connecting lugs of the inductances.

The filter according to the invention is therefore embodied by the assembly of a single block of inductances and a single block of capacitors inside a hermetic casing having four insulated pins which form the lead-outs from the filter.

The main advantage of the filter according to the invention is the low cost of its construction, which is readily adaptable to mass production. Another advantage is the reduced amount of space taken up by the filter according to the invention.

Other features and advantages of the electric filter according to the invention will become apparent from the following description for an understanding of which reference should be made to the accompanying drawings wherein.

Figure 1:
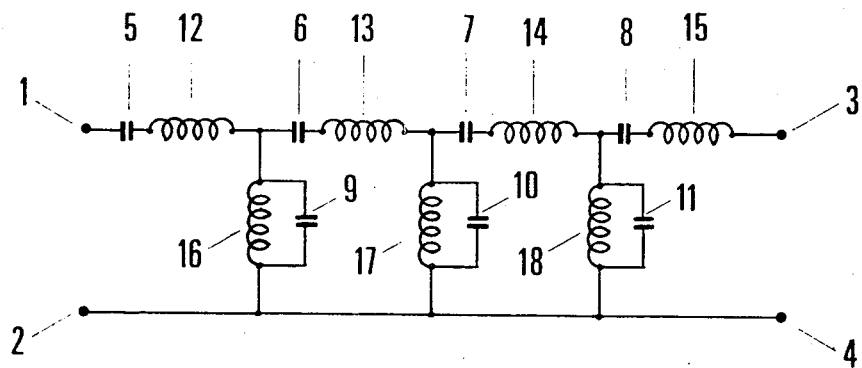
FIG. 1 shows a circuit diagram for a filter according to the invention, the figure being exemplary and not limitative.

The purely exemplary circuit diagram shown in FIG. 1 is for a band-pass flter comprising two input terminals 1, 2, two output terminals 3, 4, seven capacitors 5-11 and seven inductances 12-18.

Figure 2:
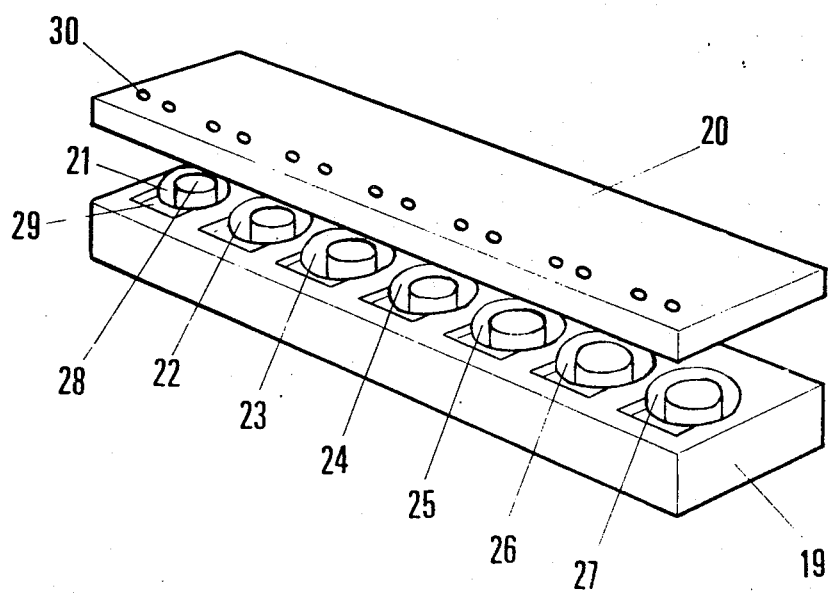
FIG. 2 shows the ferrite block common to all the inductances of the filter according to the invention.

The ferrite block shown in FIG. 2 comprises two parts — a base 19 and a cover 20. The two parts are made by pressing in a mould; externally, the base 19 has a rectangular parallelepipedic shape formed with sockets or recesses or the like 21-27 adapted to receive toroidal inductance windings. Each socket, as 21, is in shape cylindrical, with at its center a solid cylinder 28 forming the central magnetic core of the inductance; at the side is a recessed part 29 for the connecting wiring. The cover 20 is also of rectangular parallelepipedic shape and is formed with a number of apertures, as 30, positioned appropriately for bringing out the rods or tags or the like for connecting the inductances. Such rods or tags, to which the inductance lead-out wires are soldered, are rigid and are secured parallel to the winding axis on the winding former.

Figure 3:
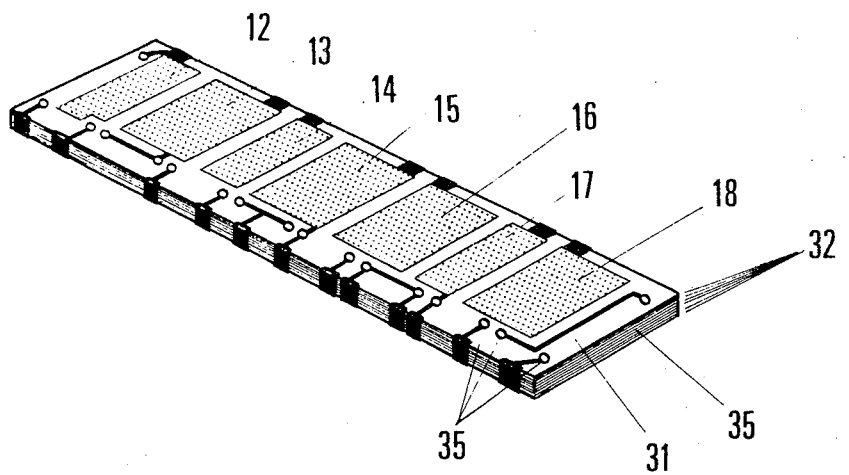
FIG. 3 shows the plate or wafer or the like which bears all the capacitors of the filter according to the invention.

Referring now to FIG. 3, the capacitor block is a single insulating plate or wafer or the like 31 consisting of an assembly of mica or ceramic strips 32. The capacitors 12-18 have dimensions which depend upon the calculated values for the filter whose circuit diagram is shown as an example in FIG. 1.

Figure 4:
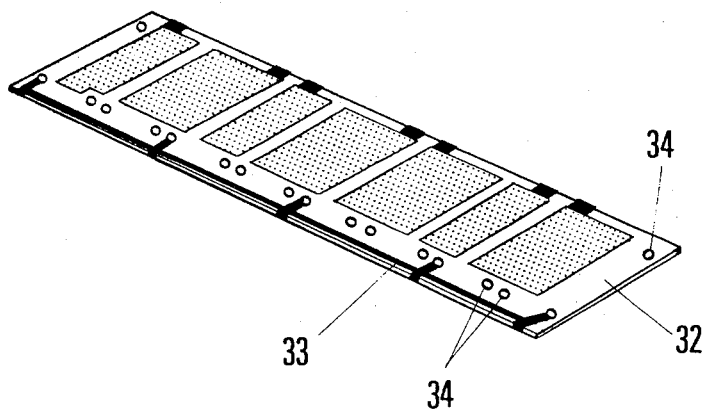
FIG. 4 shows an element of the wafer of FIG. 3.
Figure 5:
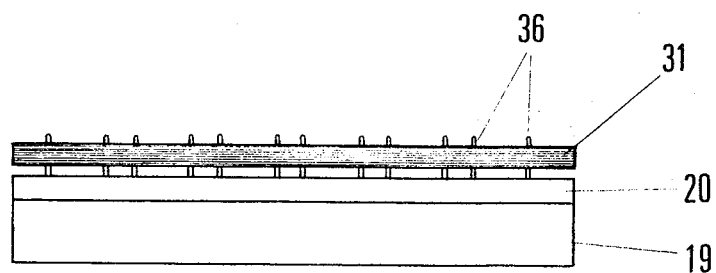
FIG. 5 shows the mechanical assembly of the inductance block and capacitor block.

FIG. 4 shows one of the mica or ceramic strips 32 used for the member 31. The metal deposit forming the capacitor plates and the connecting conductors, as 33, are produced by serigraphy or by any other known process. Each strip, as 32, is pierced with apertures 34; when the strips, as 32, are stacked to form the member 31, the apertures 34 are in alignment with one another to give cylindrical passages, as 35, adapted to be engaged by the connecting pins 36 of the inductance block 19-20 of FIG. 5. Some of the passages or apertures 36, mainly those at the ends of the member 31, are connected to the output terminals, as 37, of casing 38 (FIG. 6) which engages intimately around the filter according to the invention. The four outlet pins, as 37 (FIG. 6), which correspond to the input terminals 1, 2 and to the output terminals 3, 4 (FIG. 1), are insulated from the casing 38 by known processes such as the use of glass beads. In known manner the casing 38 provides mechanical, electrical, magnetic and climatic protection of the filter according to the invention.

Figure 6:
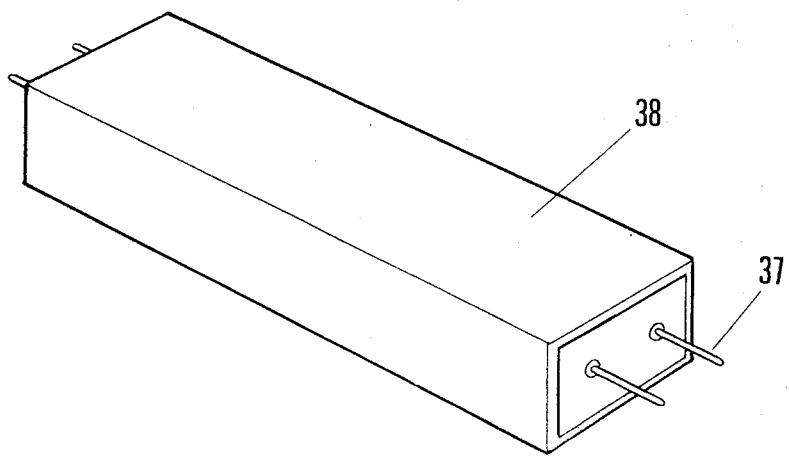
FIG. 6 is an outside view of a filter according to the invention.

The member 31 (FIG. 5) is usually placed in contact with the top surface 20 (FIG. 2) of the cover of the block of ferrite inside the casing 38 (FIG. 6).

The filter according to the invention, which can, with advantage, be made compact as shown in FIG. 6, has many other advantages. More particularly, its construction is suitable for automated manufacturing processes. Stock-holding, control and spare parts management needed for its manufacture are greatly reduced.

Another advantage of the filter according to the invention if its small size. It is considerably smaller than known filters, in which mechanical parts had to be provided around each ferrite block corresponding to an inductance in order to secure the same and provide magnetic and elctric shielding of it, thus resulting in a considerable waste of space. In the filter according to the invention, each inductance forms part of the single inductance block, and so there is no need to provide individual mechanical securing and protecting parts for each inductance.

There are of course many possible variants of embodiment of the invention, and the embodiment described in the foregoing should be considered as having been given by way of explanation and without any intention of limitation. For instance, the ferrite block, instead of comprising a main part bearing the cylindrical winding cores and an extra part forming a cover, could be embodied as two halves symmetrical with respect to a plane equidistant from the main outside surfaces of the integers 19 and 20 of FIG. 2. However, the embodiment hereinbefore described is considered preferable in practice because it greatly simplifies the problem of leading out the connections of the inductances.

What we claim is :

1 An electric filter construction for telecommunication equipment, in the form of an assembly of inductances and capacitors on a single insulating wafer comprising;

said inductances of said assembly in the form of magnetic cores consisting of common ferrite block having two continguous parts, one being a main part comprising cylindrical cores for the inductances and the other part being a cover;

said capacitors being grouped on said single indulating wafer;

said insulating wafer being placed in contact with the outside surface of said cover, and said insulating wafer bearing in printed circuit form a wiring interconnecting said inductances and capacitors, said printed circuit being formed with apertures for connecting tags connected to said inductances.

2. An electric filter construction for telecommunication equipment consisting of an assembly of capacitors and of a plurality of inductances each having a magnetic ferrite core, in which all the cores of said inductances are included in a common magnetic ferrite block having two contiguous parts each having at least one plane surface, at least one of said contiguous parts including recesses in number equal to that of said inductances and each having a size and a shape adapted to receive a winding for one of said inductances, while the other one of said contiguous parts is provided with apertures for connecting tags connected to said inductances, and in which said contiguous parts are assembled by placing them in contact along two of said plane surfaces respectively belonging to one and the other of said parts.

3. An electric filter construction according to claim 2, in which said contiguous parts are respectively a main part and a cover.

4. An electric filter construction according to claim 2, in which said contiguous parts are substantially identical and form two halves symmetrically assembled along said plane surfaces.

5. An electric filter construction according to claim 2, in which said capacitors are grouped on a single insulating wafer, in which said wafer is placed in contact with a plane outer surface belonging to one of said contiguous parts, and in which said connecting tags are connected to said capacitors.

6. An electric filter construction according to claim 2, in which each of said recesses has the shape of a hole comprised between two coaxial cylindrical surfaces.

7. An electric filter construction according to claim 6, in which each of said recesses further comprises a side part located in the vicinity of said plane surface for the passing through of said connecting tags.

* * * * *